United States Patent

[11] 3,549,814

[72] Inventors Richard J. Jaeger, Jr.
Colts Neck;
George Riddell, Lincroft, N.J.

[21] Appl. No. 737,540
[22] Filed June 17, 1968
[45] Patented Dec. 22, 1970
[73] Assignee Bell Telephone Laboratories, Incorporated
Murray Hill, Berkeley Heights, N.J.
a corporation of New York

[54] PULSE CODE MODULATION MULTIPLEX SIGNALING SYSTEM
10 Claims, 3 Drawing Figs.

[52] U.S. Cl. .......... 179/15
[51] Int. Cl. .......... H04j 3/04
[50] Field of Search .......... 179/15A, 15SIG, 15APC, 2DP, 15ASYNC, 15.55

[56] References Cited
UNITED STATES PATENTS
3,229,259 1/1966 Barker .......... 179/15(Async)
3,083,267 3/1963 Weller .......... 179/15(Sig.)

*Primary Examiner*—Ralph D. Blakeslee
*Attorneys*—R. J. Guenther and James Warren Falk

ABSTRACT: A time division multiplex pulse code modulation system is disclosed in which each channel can simultaneously transmit a voice frequency message and one bit of a plural order binary word. All but one of the digit spaces of each channel are used to transmit the voice frequency message assigned to the channel. Each order of the binary word is associated with a different channel, and the last digit space of each channel is used to transmit the information bit for its order of the binary data word. In this manner, a conventional 24 channel system can simultaneously transmit 24 voice frequency signals and a 24 bit binary word.

INVENTORS R. J. JAEGER, JR.
G. RIDDELL
BY Donald M Duft
ATTORNEY

PULSE CODE MODULATION MULTIPLEX SIGNALING SYSTEM

BACKGROUND OF THE INVENTION

This invention relates generally to pulse type communication systems, and more particularly, to a time division multiplex pulse code modulation system. This invention further relates to a time division multiplex pulse code modulation system which simultaneously transmits voice frequency messages and plural order binary data between two points of a communication system. In further detail, the invention relates to a PCM system which simultaneously transmits voice frequency messages and plural order binary data between a telephone-switching center and a plurality of remotely situated operator positions.

It is known to transmit voice messages, binary data, or both messages and data, simultaneously over the channels of a pulse code modulation system. Heretofore, when data and messages were simultaneously transmitted, it was common practice to allocate certain of the channels for the transmission of data exclusively and to use the remaining channels for message transmission. Although this expedient was operationally satisfactory, it has its concomitant disadvantages since each channel that is assigned for data transmission reduces the number of messages that can be simultaneously transmitted over the system. This arrangement is particularly objectionable in situations in which the data channels are used only occasionally, or at least not to their full capacity, while, at the same time, the voice message channels are taxed to their capacity and are in short supply.

BRIEF SUMMARY OF THE INVENTION

It is, therefore, an object of this invention to provide a pulse code modulation system that can more efficiently transmit both voice frequency messages and plural order binary data simultaneously.

A pulse code modulation system of the type to which our invention pertains may be functionally subdivided into a plurality of time division multiplex channels each of which has a plurality of digit spaces into which is encoded the information that is transmitted over the channel. Insofar as concerns the typical use of PCM equipment in telephone systems for the transmission of voice frequency messages, all but one of the digit spaces of each channel are normally used for the transmission of the message assigned to the channel; the last digit space of each channel is used simultaneously for the transmission of call supervisory or call signaling information. This signaling information, for example, may comprise off-hook, on-hook, ringing or other types of supervisory call signals. When PCM equipment is used in this manner, data and voice messages can be simultaneously transmitted only by using certain of the channels exclusively for data and by using the remainder of the channels for message transmission.

In accordance with our invention, we provide a pulse code modulation system in which each channel can simultaneously transmit a voice frequency message, and at the same time, all channels together cooperatively transmit plural order binary data. Specifically, each channel can simultaneously transmit a voice frequency message together with one bit of a plural order binary word. Each channel is individually associated with a different binary order, and whenever data is to be transmitted, each channel receives and transmits the information bit of the order to which it is individual. In this manner a plural channel PCM system can simultaneously transmit a voice frequency message on each channel and, at the same time, can transmit a binary work having a bit capacity equal to the number of channels in the system. For example, in accordance with our invention, a conventional 24 channel system can simultaneously transmit 24 voice frequency messages and 24 data bits.

The advantage of the arrangement provided in accordance with our invention is that it permits a PCM system to simultaneously transmit data and voice messages without a concomitant reduction in the capacity of the system for message transmission.

A feature of our invention is the provision of a time division multiplex pulse code modulation system in which each channel simultaneously can transmit a voice frequency message and at least one bit of a plural order binary word.

A further feature is the provision of equipment for simultaneously applying a voice frequency message and at least one bit of a plural order binary word to each channel of the system.

A further feature is the provision of equipment for transmitting the voice frequency message assigned to a channel over all but one of the digit spaces of the channel and for simultaneously transmitting one bit of plural order binary data over the remaining digit space of the channel.

A further feature of the invention is the provision of equipment for encoding the voice message assigned to a channel into less than all of its digit spaces and for simultaneously encoding one bit of a plural order binary data word into a remaining digit space of the channel.

A further feature is the provision of equipment at a remote terminal for reconstructing the voice frequency message of each channel and for entering each binary bit transmitted over a channel into a receiving register.

DESCRIPTION OF THE DRAWING

These and other objects and features will become more apparent upon a reading of the following detailed description of one specific embodiment of the invention taken in conjunction with the drawing in which.

DETAILED DESCRIPTION

Figure 1:
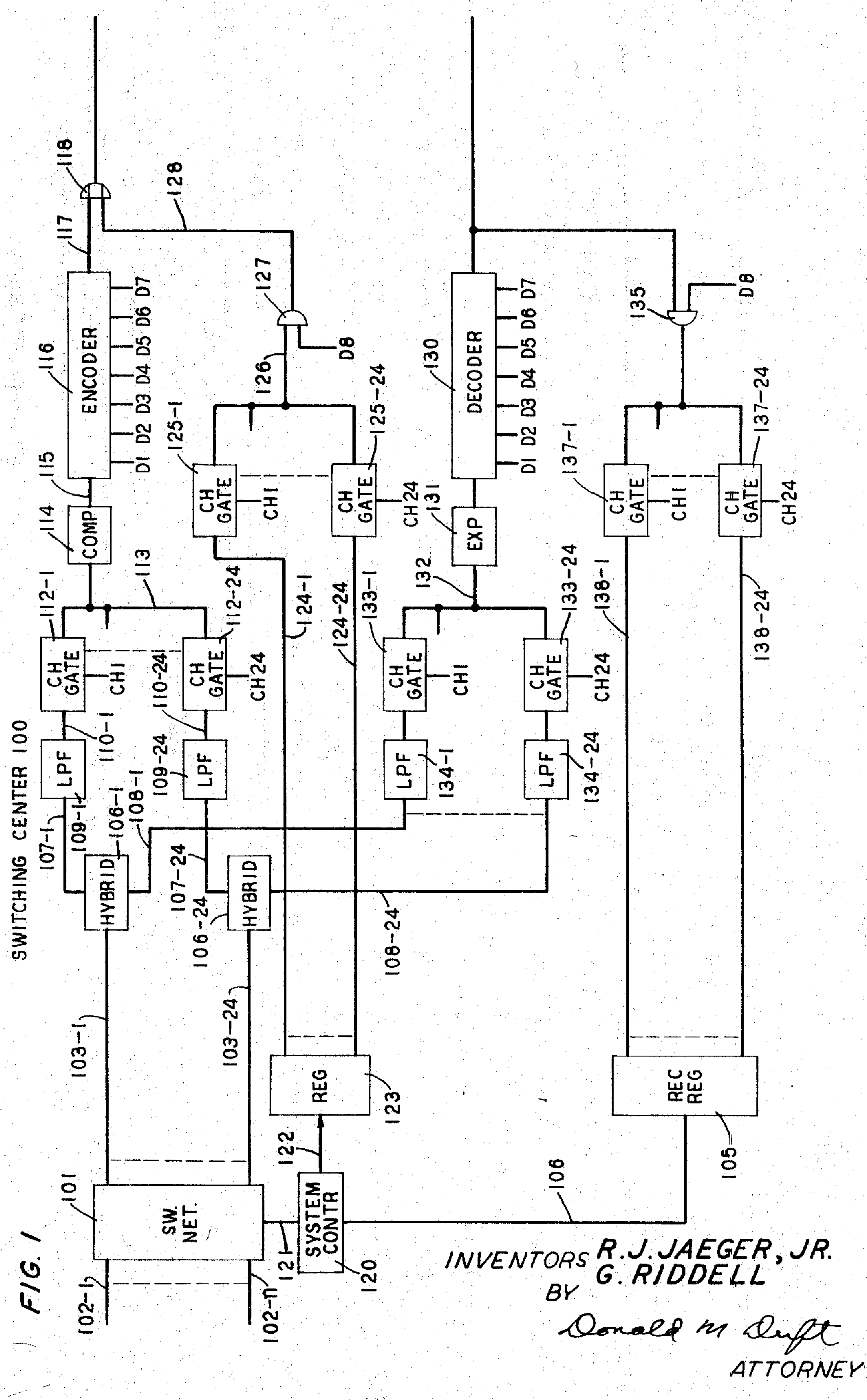
FIG. 1 shows the pulse code modulation and other equipment provided at a telephone-switching center in accordance with the teachings of our invention.
Figures 2, 3:
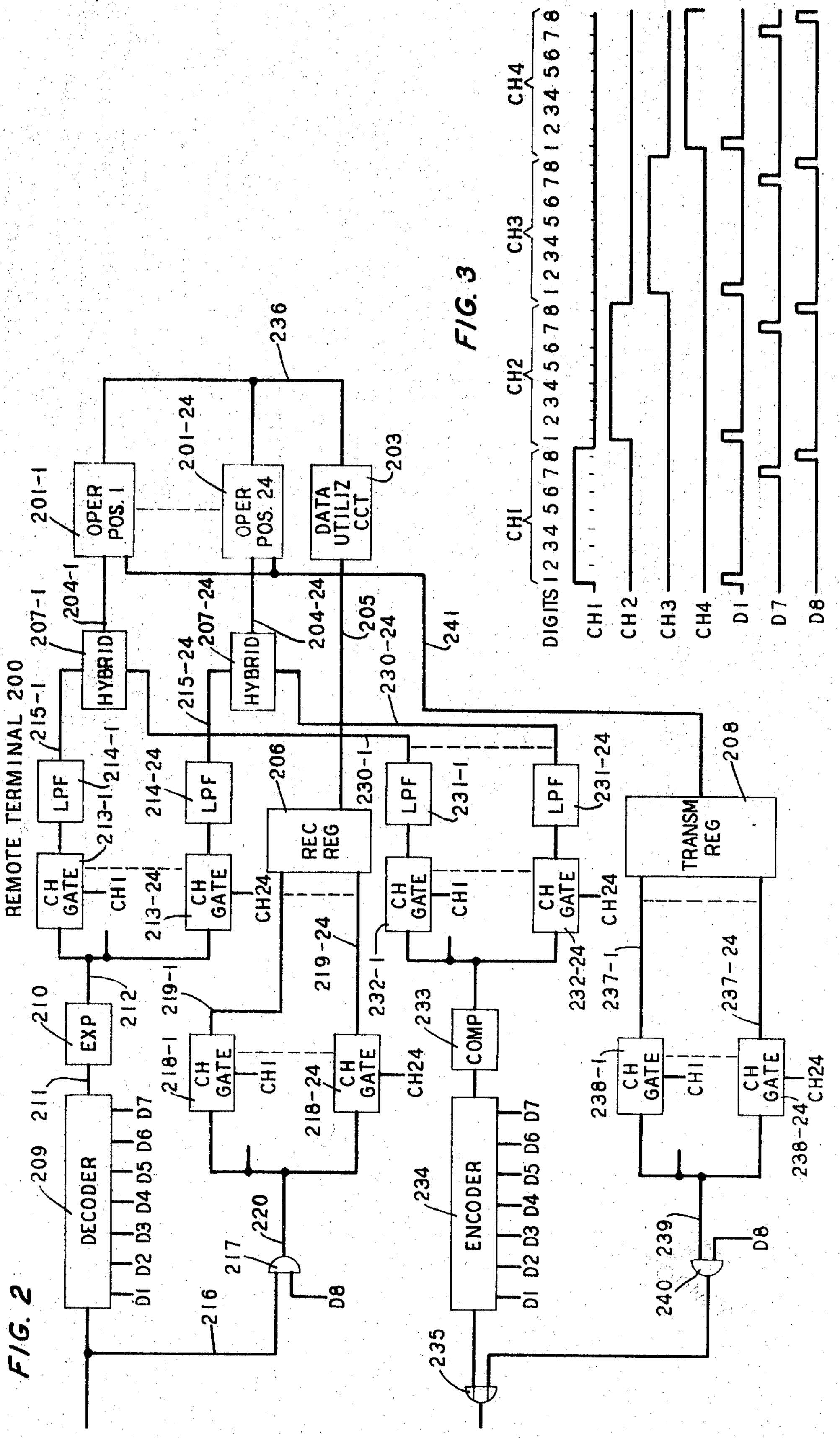
FIG. 2 illustrates the pulse code modulation and other equipment provided at a remote terminal.
FIG. 3 illustrates several of the control pulse wave forms used in the embodiment of the invention shown in FIGS. 1 and 2.

FIGS. 1 and 2 together, when FIG. 2 is positioned to the right of FIG. 1, disclose a time division multiplex pulse code modulation system which interchanges data and voice messages between a switching center 100 and a remote terminal 200. Switching center 200 may comprise a telephone office which serves person-to-person, collect, and other similar types of telephone calls that require the services of an operator for their completion. The operator positions 201—1 through 201—24 are at the remote terminal 200 and it is the operators at these positions that provide the services required on the person-to-person type calls served by office 100.

Only that part of the office 100 necessary for an understanding of the present invention is shown. This includes switching network 101, system controller 120, register 123 and receiving register 105. The controller 120 controls the operation of the office and, in so doing controls the operation of the network in its function of selectively establishing paths between conductors 102—1 through **102—*n* on its left side and conductors 103—1 through 103—24 on its right side. The conductors 102—extend to other parts of the office not shown, and in particular, to the circuits that serve the person-to-person and collect type calls. Register 123 at center 100 receives and registers the binary data that is to be transmitted to the remote terminal. This data is used at the remote terminal to control the lamp display at each operator position. Register 105 receives data that is transmitted by terminal 200 to switching center 100. This data is, in turn, applied to the controller 120 to keep it advised of the status of the equipment at terminal 200**.

Separate PCM equipment is provided for each direction of transmission between the center and the remote terminal. In the direction extending towards the remote terminal, the PCM equipment at center 100 receives the speech signals on conductors 103—1 through 103—24, encodes these signals and transmits them to the remote terminal where they are decoded and applied to conductors 204-1 to 204—24 which extend to speech circuits of the operator positions 201—1 through 201—24. This same PCM equipment also transmits binary data from register 123 to receiving register 206 at the remote terminal. With respect to the direction of transmission extending from the remote terminal back to the switching center, the PCM equipment receives the speech signals originating at the operator positions 201—1 through 201—24 and transmits them back to center 100 when they are applied to conductors 103—1 through 103—24. This same PCM equipment also transmits data from register 208 at the remote terminal to receiving register 105 at the switching center.

Conductor paths 103—1 through 103—24 are of the two wire type and each extends from the right side of the network 100 to one of the hybrid elements 106—1 through 106—24. For example, the two wire path 103—1 extends from the switching network to hybrid 106—1. The transmission beyond each hybrid network is on a four wire basis with the two directions of transmission being separated by the conjugacy of the network. Thus, the transmission path extending from hybrid 106—1 towards the remote terminal includes conductors 107—1, low pass filter 109—1, channel sampling gate 112—1, compressor 114, and encoder 116.

Each filter 109—limits the top frequencies of the transmitted voice messages to 4 kilocycles. Each channel gate 112-—is enabled at a unique time over its CH- lead by a so-called channel pulse at an 8 kilocycle rate. As shown for channels 1 through 4 in the first four lines of FIG. 3, the channel pulses assigned to each channel are displaced in time from all other channel pulses. The input applied to compressor 114 is a time division multiplexed sequence of speech samples from all of paths 103-, hybrids 106-, filters 109-, and gates 112-. The signals received by compressor 114 are compressed and applied to the input of encoder 116. The output of the encoder is applied to the upper input of OR gate 118.

Encoder 116 is of the seven digit type. It employs seven message digits per channel in the time scale to translate each compressed sample applied to it into a binary code group of "1'a" and "0's" which occupy seven consecutive digit spaces or time slots. To control the timing of the encoder 116, timing pulses which reoccur during the same numbered time slots of each code group are applied to the timing control leads D1 through D7. As shown in the fifth line of FIG. 3 the Dl lead is energized during the first time slot or digit space assigned to each channel and it controls the generation of the marks or spaces in the most significant digit space. As shown in the sixth line of FIG. 3, the D7 lead is energized during the seventh time slot for each channel and it controls the generation of the marks or spaces in the least significant digit space. The conductors D2 through D6 are energized in a similar manner during their respective digit spaces for each channel. The encoder, may by way of example, be of the type disclosed in R. E. Yaeger U.S. Pat. 3,051,901, issued Aug. 28, 1962.

The portion of the equipment at switching center 100 which has been described thus far is conventional in the pulse code modulation art and provides a means for transmitting 24 speech signals from conductors 103—1 through 103—24 to the receiving equipment at the remote center 200. The remaining transmitting circuitry illustrated in FIG. 1, in accordance with our invention, provides a high speed data-signaling path from the switching center to the remote terminal. This data is transmitted to control the lamp displays at the operator positions 201-. The data to be transmitted is generated within system controller 120, and applied via path 122 to the register 123. Each order of the register is functionally associated with a different channel and the output of each register order is connected to an individual channel scanning gate 125-. Thus, the first order of the register is connected over conductor 124—1 to channel gate 125—1 which, by means of conductor CH1, is energized and made conductive whenever channel 1 is scanned. In a similar manner, the remaining orders of the register are connected to the remainder of the channel gates 125-. The output of each gate 125- is connected to the upper input of AND gate 127. This gate is energized by means of its lower input conductor D8 upon the reception of the D8 digit pulse during the scan time of each channel as shown in FIG. 3. Thus, the application of the D8 pulse to gate 127 during the channel 1 scan time permits the binary information in the first order of the register to pass through gate 127. In a similar manner, the application of the D8 pulse to gate 127 during the scan time for each of the remaining channels permits the binary information in the remaining register orders to pass through gate 127, and over a path 128 to the lower input of OR gate 118.

OR gate 118 conducts when either of its inputs is energized and thus 24 bits of binary information may be transmitted to the remote terminal together with 24 encoded speech signals during each scan of the 24 channels. Specifically, the encoded speech signals of channel 1 are transmitted during the first seven digit spaces as channel 1 is scanned by the CH1 pulse. This information represents the encoded speech signal of channel 1. The binary information for the first order of the register is then transmitted in the D8 pulse time for channel 1. In a similar manner, as each succeeding channel is scanned, the speech signals associated with the channel are transmitted during the D1 to D7 pulse time and the binary information received from its order of the register is transmitted during the D8 pulse time of the channel. In this manner, upon the completion of a single scan of all channels, it may be seen that 24 speech signals may be transmitted during the 24 D1 to D7 pulse times and that 24 binary bits are transmitted during the 24 individual D8 pulse times.

The receiving circuitry for the speech signals and binary data transmitted to the remote terminal is shown on FIG. 2. The transmitted pulses representing the 24 speech signals are received by decoder 209 which may, for example, be of the type disclosed in U.S. Pat. 2,991,422, issued July 4, 1961 to Mr. R. E. Yaeger. Control pulses are supplied to the decoder during the D1 through D7 digit spaces of each channel to control the decoder timing in a conventional manner well-known in the art. The output of the decoder is passed through expander 210 and the output of the expander is in the form of the same succession of message samples as is applied to compressor 114 of FIG. 1. The message distribution to each of the receiving channels takes place at the output of the expander. The output side of the expander is connected to each of the channel gates 213—1 through 213—24 and the output of each such gate is connected to an individual one of the low pass filters 214—1 through 214—24. The channel pulses, CH1 through CH24 as shown in FIG. 3, are applied to the corresponding one of the channel gates in order to separate the message sample of each channel from those of the other channels. Thus, channel pulse CH1 is applied during the scanning time of channel 1 to the channel gate 213—1 in order to separate the speech samples of channel 1 from those of the other channels. In a similar manner, during the scanning of channel 24, channel pulse CH24 is applied to channel gate 213—24 to render it conductive when channel 24 is scanned. The output of each channel gate is applied to an individual one of the low pass filters 214—1 through 214—24 which removes the high frequency component from the encoded message samples and restores the message to its original form. The output of each low pass filter is connected over an individual one of conductors 215- to one of the hybrids 207-. Thus, the output of low pass filter 214—1 is connected by means of conductor 215—1 to hybrid 207—1. The output of hybrid 207—1 is on a two wire basis and is applied to path 204—1 which interconnects the hybrid with operator position 201—1. The low pass filters, the hybrids, and the operator position associated with the other speech channels are similarly connected.

The input of decoder 209 and one input of AND gate 217 are connected in parallel and thus, the same time division multiplexed signal that is applied to the decoder is also applied to the upper input of the AND gate. The lower input of the AND gate, in accordance with our invention, receives a control pulse during the D8 pulse time of each channel. Thus, during each scan of the 24 channels, gate 217 is turned ON whenever a binary "1" is received during the D8 pulse time of a channel. The output of AND gate 217 therefore comprises a serial stream of binary bits representing the binary word stored in register 123.

The output of AND gate 217 is connected by conductor 220 to the input of each of the channel gates 218—1 through 218—24. These channel gates are energized sequentially by the channel pulses CH1 through CH24 as indicated. Thus, gate 218—1 is energized during the channel 1 scanning time by pulse CH1, gate 218—24 is energized by the channel pulse CH24. Although the output of AND gate 217 comprises a serial bit stream representing the binary work in register 123, each gate 218- passes only the binary bit of this stream that is individual to its associated binary order. For example, gate 218—1 is enabled only during the scanning time for channel 1 and it passes only the binary bit in the first order of the work stored in register 123. This binary bit is passed over conductor 219—1 to the first order of receiving register 206. In a similar manner, each of the remaining channel gates 218- passes its associated bit and enters it into the appropriate order of register 206. Upon the completion of a single scan of all 24 channels, the binary bits stored in register 123 are transmitted to the remote terminal and are entered into register 206. The output of this register is connected by path 205 to the data utilization circuit 203 which may use the information it receives to control lamp displays at the operator positions via conductors 236.

The equipment provided in accordance with our invention also permits operator speech signals and binary data words to be transmitted simultaneously from the remote terminal back to the switching center. The operator speech signals are transmitted from each position circuit over one of conductor paths 204- on a two wire basis to the hybrid 207- associated with the position. The hybrid converts the two wire transmission to four wire transmission and the operator speech signals are transmitted over one of conductors 230- to the low pass filters 231-, the channel gates 232-, compressor 233, encoder 234, and OR gate 235. These elements cooperate in the same manner as already described for FIG. 1 to encode the operator speech signals and transmit them back to the PCM receiving equipment of FIG. 1. The binary data that is to be transmitted from the remote terminal to the switching center is initially stored in transmitting register 208. The binary bit in each order of register 208 is applied over one of conductors 237- to a channel gate 238- and, in turn, to the upper input of AND gate 240. Each gate 238- passes the binary bit in its order of register 236 to AND gate 240 which passes the bit back to the center 100 during the eighth time slot of each channel.

The encoded voice message signals received by the equipment at center 100 are decoded by decoder 130, passed through expander 131, and applied to the channel gates 133—1 through 133—24. Each of these gates applies its output through an associated one of low pass filters 134- and, in turn, over one of conductor 108- to its associated hybrid 106-. Each hybrid converts the four wire transmission back to two wire transmission and applies the received signal to its conductor 103- extending to the switching network. The encoded binary data received by center 100 is applied to AND gate 135 which, during the eighth time slot of each channel, applies it to the 24 channel gates 137-. Each of these gates passes the binary information bit for its channel and applies the bit over one of conductors 138- to the appropriate order of the receiving register 105. The information in this register, in turn, is passed over to path 104 back to the system controller.

It may be seen from the foregoing description that our invention provides facilities whereby 24 speech signals together with up to 24 bits of a binary word may be simultaneously transmitted over a 24 channel pulse code modulation system without degrading the capacity of the system for voice transmission.

It is to be understood that the above description is but illustrative of the application and principles of the invention. Numerous other arrangements may be devised by those skilled in the art without departing from the spirit and scope of the invention. For example, the foregoing has illustrated the manner in which a 24 bit binary word could be transmitted over a 24 channel system. This showing is merely exemplary since our invention is not limited to the use of a 24 channel system and furthermore, it is not necessary that a binary data bit be transmitted over each and every channel. Depending upon the quantity of plural order information that must be transmitted, it may be satisfactory to use less than all of the channels for the transmission of data bits. Also, in the foregoing description, the voice message signals are encoded into the first seven digit spaces of each channel and the binary information for the channel is encoded into the eighth digit space. This showing is merely exemplary and, in accordance with the principles of our invention, additional digit spaces per channel could be allocated for the transmission of binary data, if desired. For example, assuming a 24 channel system and the assignment of two digit spaces per channel for data transmission, a 48 bit binary data word could be transmitted simultaneously with 24 speech messages. In this case, a speech message would be encoded into digit spaces 1 through 6 of each channel and the two data bits for the channel would occupy its digit spaces D7 and D8.

We claim:

1. In a time division multiplex pulse code modulation communication system having a plurality of channels, a plurality of sources of voice frequency messages each of which is individual to one of said channels, means for transmitting an encoded representation of each voice frequency message over the channel to which it is individual, a plural order binary data word source, a plural order register each order of which is individual to one of said channels, means for entering a binary data word from said source into said register, means responsive to said entering for applying the binary data bit in each order of said register to the channel to which said order is individual, and means for transmitting each bit of said word over a different one of said channels simultaneously with the transmission of the voice frequency message individual to each of said channels.

2. In a time division multiplex pulse code modulation communication system having a plurality of channels each of which consists of a predetermined number of digit spaces, a plurality of sources of voice frequency messages each of which is individual to one of said channels, means for encoding each of said messages into less than all of the digit spaces of its channel for transmission of said message over said system, a plural order register each order of which is associated with one of said channels, means for entering a binary data word into said register, means for applying the binary information bit in each order of said register to the channel with which it is associated, and means for transmitting said binary word over said system by inserting each binary bit received by a channel into one of its digit spaces that is not used for message transmission.

3. The invention of claim 2 in combination with time division multiplex pulse code modulation-receiving equipment comprising, means for reconstructing the voice frequency message applied in encoded form to each of said channels, a receiving register, means for detecting each binary bit applied to one of said channels, and means for entering each detected binary bit into a different order of said receiving register.

4. In a time division multiplex pulse code modulation communication system having a plurality of channels each of which consists of a predetermined number of digit spaces, a plurality of sources of voice frequency messages each of which is individual to one of said channels, means for encoding a voice frequency message into all but one of the digit spaces of its channel for transmission of said message over said system, a plural order register each order of which is individual to one of said channels, means for entering a binary data word into said register, means for applying the binary information bit in each order of said register to the channel to which it is individual, and means for transmitting said binary word over said system by inserting each binary bit into the last remaining digit space of the channel to which it is applied.

5. The invention of claim 4 in combination with time division multiplex pulse code modulation-receiving equipment comprising, means for reconstructing the voice frequency message applied to encoded form to each channel, a receiving register, means for detecting each binary bit inserted into the last remaining digit space of any one of said channels, and means for entering each detected binary bit into an individual order of said receiving register.

6. In a digital message transmission system, a transmitter for converting message information into successive pulse code groups having a predetermined number of message digit spaces each, and means for transmitting plural order binary data signals simultaneously with said message information which comprises, means for adding a further digit space to each of said groups exclusive of said message digit spaces, and means to transmit one bit of said plural order binary data in said added digit space of each of said channels.

7. In a pulse code modulation message transmission system interconnecting a pair of terminals and employing regularly recurring code groups each group of which represents a unique transmission channel with each channel containing a predetermined number of successive digit spaces of substantially equal time duration for message transmission, an arrangement for transmitting plural order binary data between said terminals which comprises, means at one of said terminals for adding a further digit space exclusive of and in sequence with said message digit spaces to each of said groups, said further digit space having substantially the same time duration as each of said message digit spaces, a plural order register each order of which is individual to one of said channels, means for entering a binary data word into said register, means for applying the binary information bit in each order of said register to the channel to which it is individual, means for transmitting said binary word over said system by encoding each binary bit into the said added digit space of the channel to which it is applied, and means to reconstruct the said binary word in response to the content of said added digit space at the other of said terminals.

8. In a telephone-switching system, a switching center, a terminal remotely situated with respect to said switching center, a plurality of operator positions at said terminal, a plurality of time division multiplex pulse code modulation communication channels interconnecting said switching center with said terminal, means for extending call speech signals received by said switching center to said operator positions at said terminal over said channels with the speech signals for each call being extended over an individual one of said channels, and means for transmitting call data to any one of said positions over a plurality of said channels simultaneously with the transmission of speech signals over said channels.

9. The invention of claim 8 in combination with means at said terminal for receiving said transmitted call data, and means responsive to said reception for applying said data to any selected one of said positions.

10. The invention of claim 8 in combination with a plurality of channels for returning speech signals from said operator positions at said terminal to said switching center with each speech signal being returned over an individual one of said channels, and means for returning call data from said terminal to said center over a plurality of said last named channels simultaneously with the transmission of speech signals over said channels.